United States Patent [19]
Smith

[11] 4,088,274
[45] May 9, 1978

[54] BOTTLE CRUSHER

[76] Inventor: Richard O. Smith, 7223 Comstock, Whittier, Calif. 90602

[21] Appl. No.: 722,864

[22] Filed: Sep. 13, 1976

[51] Int. Cl.² .............................................. B02C 19/12
[52] U.S. Cl. ..................................................... 241/99
[58] Field of Search ................... 241/84, 99, 100, 162

[56] References Cited
U.S. PATENT DOCUMENTS

| | | | |
|---|---|---|---|
| 2,167,040 | 7/1939 | Farner et al. | 241/99 |
| 2,168,226 | 8/1939 | Lieb | 241/99 |
| 2,176,552 | 10/1939 | Vocaturo | 241/99 |
| 2,190,971 | 2/1940 | Boedeker | 241/99 |
| 2,756,937 | 7/1956 | Smith | 241/99 |

Primary Examiner—Granville Y. Custer, Jr.
Attorney, Agent, or Firm—Boniard I. Brown

[57] ABSTRACT

A glass bottle is fragmented for ease of disposal by crushing the bottle between a pair of crushing jaws having pointed teeth which apply highly concentrated crushing loads to the bottle to effect fragmenting of the bottle with minimum crushing force on the jaws. In the preferred form of the invention, the crushing jaws are contained in a housing having a hinged lid mounting one jaw for closing movement of the jaws to crush a bottle by closure of the lid and/or movement of the latter jaw relative to the lid when closed. The bottle fragments are collected in a receptacle which is removable from the housing for disposal of the fragments.

9 Claims, 8 Drawing Figures

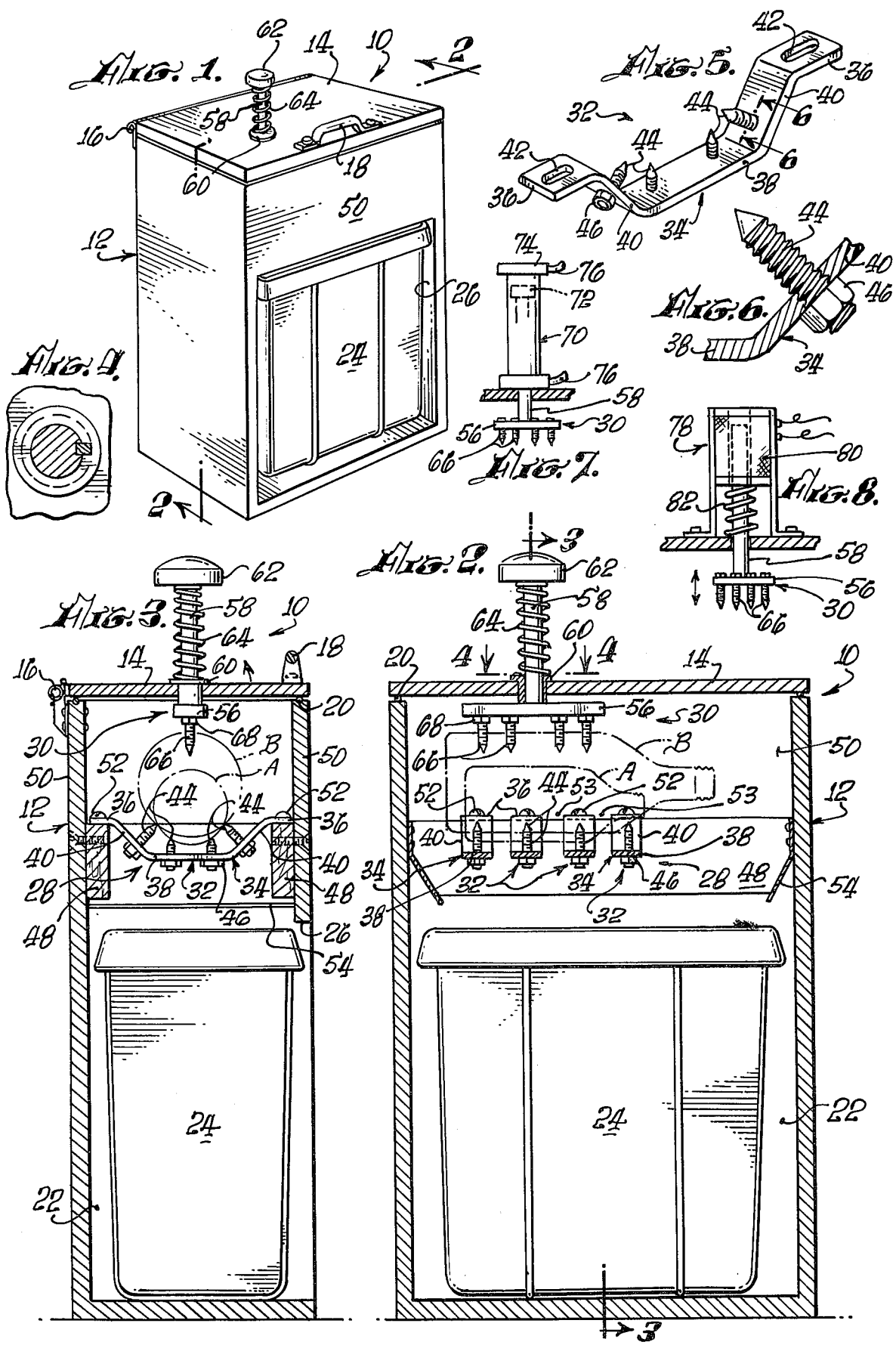

BOTTLE CRUSHER

BACKGROUND OF THE INVENTION

1. Field of the Invention

This invention relates generally to trash disposal aids and more particularly to a novel bottle crusher for fragmenting glass bottles and the like for ease of disposal.

2. Discussed of the Prior Art

As will appear from the ensuing description, the bottle crusher of the invention may be utilized as a general purpose bottle crusher for breaking up or fragmenting any type of glass bottle for ease of disposal or other purpose. The invention, however, is particularly concerned with and will be described in the context of, breaking empty liquor bottles in commercial establishments which serve liquor both for ease of disposal of the empty bottles and compliance with liquor laws.

Disposal of empty liquor bottles is a major problem in cocktail bars, lounges, and other commercial establishments which serve liquor in large quantity. Such establishments must also comply with liquor laws which require breaking of empty liquor bottles to prevent their reuse. Compliance with such liquor laws is generally accomplished by breaking the neck off each empty bottle. In some cases, the thus fragmented bottle is simply thrown into a trash receptacle. This method of disposing of the bottles, however, has a disadvantage in that the empties take a large volume of space. As a consequence, the empty bottles are sometimes fragmented or crushed to reduce their volume for ease of containment and disposal.

A variety of bottle breakers or crushers for this purpose have been devised. Examples of such bottle crushers are described in U.S. Pat. Nos. 2,125,651, 3,151,814, 2,167,040, 2,168,226, 2,176,552, 2,178,797, 2,215,508, 2,665,632, and 3,779,157.

SUMMARY OF THE INVENTION

This invention provides an improved bottle breaker or crusher of the character described. The bottle crusher is particularly adapted for use in commercial establishments such as cocktail lounges, bars and the like, but may be used in the home or in other types of establishments, as will appear from the ensuing description.

The bottle crusher of the invention has a pair of crushing jaws which are relatively movable away from one another to receive a bottle between the jaws and toward one another to fragment the bottle. According to one feature of the invention, at least one jaw comprises a plurality of sharp teeth which apply highly concentrated crushing loads to a bottle during closing movement of the crushing jaws to effect fragmenting of the bottle with minimum crushing or closing force on the crushing jaws.

In the presently preferred embodiment of the invention, one crushing jaw is a stationary or fixed jaw and the other jaw is movable toward and away from the fixed jaw. The fixed jaw has a plurality of projecting teeth arranged to form a cradle for receiving a bottle to be broken. The movable jaw is provided with projecting teeth and is movable toward the stationary jaw by hand and/or operation of a power actuator to fragment a bottle cradled in the stationary jaw. The jaw teeth are individually adjustable to locate each tooth in proper engagement with the bottle to be broken.

According to another feature of the invention, the bottle crushing jaws are contained in a housing having a top opening closed by a hinged lid. The fixing crushing jaw is stationarily mounted within the housing below the lid with its cradle opening upwardly toward the lid. The movable jaw is carried on the lid for movement toward the fixed jaw to fragment a large bottle in the fixed jaw by swinging of the lid to closed position. The lid jaw is also movable relative to the lid when in its closed position toward and away from the fixed jaw to break a smaller bottle cradled in the fixed jaw. The fixed jaw has openings through which the fragments of a broken bottle drop into an underlying receptacle. This receptacle is removable from the housing for disposal of the bottle fragments.

BRIEF DESCRIPTION OF THE DRAWINGS

FIG. 1 is a perspective view of a bottle crusher according to the invention;

FIG. 2 is an enlarged section through the bottle crusher taken on line 2—2 in FIG. 1;

FIG. 3 is a section taken on line 3—3 in FIG. 2;

FIG. 4 is an enlarged section taken on line 4—4 in FIG. 2;

FIG. 5 is an enlarged perspective view of one toothed jaw element of the stationary crushing jaw of the bottle crusher;

FIG. 6 is an enlarged section taken on line 6—6 in FIG. 5;

FIG. 7 illustrates a power actuator for the movable crushing jaw; and

FIG. 8 illustrates a modified power actuator for the movable crushing jaw.

DESCRIPTION OF THE PREFERRED EMBODIMENT

Turning to these drawings, the illustrated bottle crusher 10 of the invention has a cabinet-like housing 12 which may be suitably constructed and ornamented to match any decor. The housing has a top opening normally closed by a lid 14 which is joined along one edge to the housing 12 by a hinge 16 for swinging of the lid between open and closed positions, as illustrated by the arrow in FIG. 3. The lid mounts a handle 18 by which the lid may be opened and closed. About the upper edge of the housing 12 is a ceiling strip 20 against which the lid 14 seats when closed.

In the lower portion of the housing 12 is a chamber 22 for containing a removable receptacle 24 for collecting broken bottle fragments, as explained later. Receptacle 24 is insertable into and removable from the housing 12 through a side opening 26 in the housing.

Contained within the housing 12 are a pair of bottle crushing jaws 28 and 30. As explained below, jaw 28 is stationary fixed within the housing 12 and, for this reason, is hereinafter referred to in places as the fixed or stationary jaw. Jaw 30 is carried by the housing lid 14 and, as explained below, is movable with and relative to the lid toward and away from the fixed jaw 28. For this reason, jaw 30 is hereinafter referred to in places as the movable jaw.

Stationary jaw 28 comprises a plurality of toothed jaw elements 32. As shown best in FIG. 5, each jaw element 32 includes a metal strap 34 having coplanar ends 36, an offset or depressed central portion 38, an intervening inclined portions 40. The strap end portions 36 contain longitudinal slots 42. As will appear from the ensuing description, the position of the strap illustrated in FIG. 5 is its normal position, whereby the concave side of the strap is its normally upper side. Threaded in the depressed central portion 38 and inclined portions 40 of the strap 34 are pointed teeth 44. These teeth have their pointed ends projecting upwardly beyond the upper side of the strap. As shown in FIG. 6, each tooth 44 mounts a jam nut 46. As explained below, the teeth 44 are adjustable and are retained in adjusted position by their jam nuts 46.

Referring to FIGS. 2 and 3, the stationary crushing jaw elements 32 are supported within the crusher housing 12 in horizontally spaced side by side relation, directly above the lower housing chamber 22 and its contained receptacle 24, by shoulder members 48 secured to the inner sides of opposing housing side walls 50. The straps 34 of these jaw elements span the space between the shoulder members 48 with the strap ends 36 resting on the upper edges of the shoulder members and are secured to the shoulder members by screws 52 extending through the slots 42 in the strap ends. As noted earlier and shown in FIGS. 2 and 3, the concave sides of the strap members face upwardly. The teeth 44 of the jaw elements 32 are arranged to form an upwardly opening cradle for supporting bottles to be broken, as illustrated in broken lines in FIGS. 1 and 2. In this regard, it will be observed that the several teeth 44 of the lower stationary crushing jaw 28 are adjusted to form a cradle for supporting a bottle A of relatively small diameter such that all of the teeth engage the bottle and for supporting a bottle B of larger diameter, such that only certain teeth of the jaw engage the bottle. Thus, it will be observed that the cradle formed by the lower stationary crushing jaw 28 has a longitudinal axis extending horizontally, parallel to the plane of the paper in FIG. 2 and normal to the plane of the paper in FIG. 3. The teeth 44 of the stationary jaw are arranged in parallel rows parallel to the longitudinal cradle axis. The teeth are adjusted so that the teeth of all of the rows engage the smaller bottle A while only the teeth of the two outer rows engage the larger bottle B.

The spacings between the jaw elements 32 of the stationary crushing jaw 28 define openings 53 through which bottle fragments may drop into the underlying trash receptacle 24 when a bottle is broken in the bottle crusher, as explained shortly. In order to assure entrance of these fragements into the receptacle, inwardly sloping skirt members 54 may be fixed in position below the stationary jaw for guiding the fragments into the receptacle.

The movable bottle crushing jaw 30 comprises a plate 56 below and parallel to the housing lid 14. Attached to the upper side of this plate at its center is a rod 58 which extends upwardly and slidably through a bearing 60 mounted in the lid 14. Fixed on the upper end of rod 58 is a knob 62. A compression spring 64 surrounds the rod 58 between the bearing 60 and the knob 62 for yieldably urging the movable crushing jaw 30 upwardly to its position of FIGS. 2 and 3. As may be observed in FIGS. 2 and 3, the movable jaw plate 56 is elongated in one direction and extends parallel to the longitudinal axis of the cradle formed by the lower stationary crushing jaw 28. The jaw plate 56 is retained in this parallel relation by means of a key 64 engaging in key ways in the upper jaw rod 58 and rod bearing 60, as shown best in FIG. 4.

Fixed to and projecting from the underside of the movable jaw plate 56 are a plurality of bottle engaging teeth 66 similar to the teeth 44 of the lower stationary crushing jaw 28. Teeth 66 are threaded in the plate 56 for vertical adjustment relative to the plate and are secured in adjusted position by jam nuts 68 on the teeth. The longitudinal axis of the movable jaw 30 is approximately aligned with the center of the cradle formed by the lower stationary jaw 28.

From the foregoing description of the movable crushing jaw 30, it will be understood that this jaw is normally retained in its upper retracted position of FIGS. 2 and 3, relative to the lid 14, by the jaw spring 64. The jaw is swingable with the lid between its open and closed position. Finally, the jaw is movable axially relative to the lid by exerting a downward force on its upper knob 62 to depress the jaw against the action of the jaw spring 64.

The manner of using the bottle crusher 10 will now be explained. A bottle to be broken or crushed is placed in the crusher by opening the lid 14 and placing the bottle in the cradle formed by the lower crushing jaw 28. As noted earlier, if the bottle is a relatively small diameter bottle, such as bottle A, it will rest on all of the lower jaw teeth 44. If the bottle is a larger diameter bottle, such as bottle B, it may rest on only the two outer rows of lower jaw teeth. In either event, a lower stationary crushing jaw 28 cradles the bottle in the manner shown.

After the bottle has thus been placed in the crusher, the lid 14 is swung downwardly to its closed position of FIGS. 2 and 3. In the event the bottle in the crusher is a relatively large diameter bottle, such as bottle B, this downward swinging of the lid may carry the teeth 66 on the upper movable crushing jaw 30 into contact with the bottle, thus fragmenting the bottle. On the other hand, if the bottle placed in the crusher is a relatively small diameter bottle, such as bottle A, closing of the crusher lid 14 may not engage the upper movable jaw teeth 66 with the bottle. In this case, the bottle is broken by exerting a downward impact on the knob 62 of the movable jaw 30 to drive the latter downwardly against the bottle.

In either event, that is whether the bottle placed in the crusher is broken by closing of the housing lid 14 or by a downward impact on the upper movable jaw 30 after the lid is closed, the bottle fragments drop through the spaces 52 between the jaw elements 32 of the lower stationary crushing jaw 28 into the receptacle 24. Periodically, this receptacle is removed through the side opening 26 in the crusher housing 12 to empty the bottle fragments.

If desired, the upper movable bottle crushing jaw 30 may be driven downwardly through its bottle crushing stroke by a power actuator rather than by hand. FIG. 7, for example, illustrates a pneumatic or hydraulic power actuator 70 for this purpose including a piston 72 fixed to the upper end of the movable jaw rod 58, the cylinder 74 in which the piston moves, and fluid lines 76 through which the ends of the cylinder may be pressurized and vented for driving the movable jaw 30 downwardly through its bottle crushing stroke and upwardly through its return stroke.

FIG. 8 illustrates a solenoid actuator 78 for the movable crushing jaw 30. This actuator includes a solenoid coil 80 surrounding the movable jaw rod 58, which in this instance is constructed of a magnetically permeable material. Energizing of the solenoid coil 80 drives the movable jaw 30 downwardly against the action of a solenoid spring 82 for returning the rod upwardly when the coil is de-energized.

The inventor claims:

1. A bottle crusher comprising:

a pair of bottle crushing jaws for straddling a bottle to be broken including a relatively stationary jaw having pointed teeth arranged to form an upwardly opening craddle for a bottle and a movable jaw opposite the open side of said cradle movable toward and away from said stationary jaw and having pointed teeth engageable with a bottle in said cradle, said cradle having a longitudinal axis, said stationary jaw having four rows of teeth parallel to said cradle axis and including two inner rows and two outer rows of teeth all adapted to engage a bottle of given diameter, said two outer rows of teeth being adapted to engage a bottle of larger diameter and said two inner rows of teeth being adapted to engage a bottle of smaller diameter than said given diameter, and means for effecting relative movement of said jaws toward one another to forcibly engage said teeth with the bottle.

2. A bottle crusher according to claim 1, wherein:

said teeth are individually axially adjustable relative to their respective jaws.

3. A bottle crusher according to claim 2, wherein:

said crusher comprises a housing having a lower chamber for a trash receptacle for receiving the broken bottle fragments, said stationary jaws mounted within said housing above said chamber and has openings through which bottle fragments may drop into said receptacle, and the housing has a hinged lid mounting said movable jaw for movement of said movable jaw toward and away from said stationary jaw by swinging of said lid to open and close positions.

4. A bottle crusher according to claim 3, wherein:

said movable jaw is mounted on said lid for movement relative to said lid toward and away from said stationary jaw once said lid is closed;

spring means for urging said movable jaw away from said stationary jaw to a normal position relative to said lid, and said movable jaw includes means for driving said movable jaw towards said stationary jaw when said lid is closed.

5. A bottle crusher according to claim 4, wherein:

said movable jaw driving means comprises means exposed above said lid for manually driving said movable jaw toward said stationary jaw.

6. A bottle crusher according to claim 4, wherein:

said movable jaw driving means comprises a power actuator.

7. A bottle crusher comprising:

a pair of bottle crushing jaws for straddling a bottle to be broken, at least one jaw including a plurality of pointed bottle engaging teeth extending toward the opposite jaw, means for effecting relative movement of said jaws toward one another to forcibly engage said teeth with the bottle, and means for individually adjusting said teeth relative to their respective jaw for engagement of all the teeth with a bottle of given diameter.

8. A bottle crusher according to claim 7, wherein:

each jaw comprises a plurality of said teeth, said one jaw is a relatively stationary jaw having said teeth arranged to form a cradle for a bottle to be broken, and the other jaw is a movable jaw located opposite the open side of said cradle for movement toward and away from the stationary jaw.

9. A bottle crusher comprising:

a housing having a top opening and a hinged lid swingable between open and closed positions relative to said top opening, a stationary bottle crushing jaw within said housing having pointed teeth arranged to form a cradle which opens upwardly for cradling a bottle to be broken in crushing position within said housing, a movable bottle crushing jaw having pointed bottle engaging teeth projecting toward said stationary jaw and mounted on said lid for movement with said lid between open and closed positions and movement relative to said lid in its closed position into and from crushing engagement with a bottle on said stationary jaw, means for moving said movable jaw relative to said stationary jaw, said housing having a chamber below said stationary jaw to contain a trash receptacle for receiving broken bottle fragments from said stationary jaw, and means for individually axially adjusting said teeth relative to their respective jaws to locate said teeth for engagement of all teeth with a bottle of given diameter.

* * * * *